US 7,757,214 B1

(12) United States Patent
Palczak et al.

(10) Patent No.: US 7,757,214 B1
(45) Date of Patent: Jul. 13, 2010

(54) AUTOMATED CONCURRENCY CONFIGURATION OF MULTI-THREADED PROGRAMS

(75) Inventors: Charles Palczak, Littleton, CO (US); Tomer Shain, Kiron (IL)

(73) Assignee: Symantec Operating Coporation, Mountain View, CA (US)

( * ) Notice: Subject to any disclaimer, the term of this patent is extended or adjusted under 35 U.S.C. 154(b) by 1101 days.

(21) Appl. No.: 11/271,706

(22) Filed: Nov. 10, 2005

(51) Int. Cl.
G06F 9/44 (2006.01)
(52) U.S. Cl. .................................. 717/121; 709/223
(58) Field of Classification Search .................. 717/121
See application file for complete search history.

(56) References Cited

U.S. PATENT DOCUMENTS 7,415,453 B2 * 8/2008 Suzuki et al. ................... 707/2
7,526,764 B2 * 4/2009 Fanshier ...................... 717/174

OTHER PUBLICATIONS

Matthew David Welsh, An architecture for highly concurrent, well-conditioned internet services, Fall 2002, University of California, Berkeley, pp. 190.*
Morajko Anna, Morajko, Oleg, Jorba Josep, Margalef Tomas, Luque Emilio, Automatic performance analysis and dynamic tuning of distributed applications, 2003, Clusters and Computational Grids for Scientific Computing. Workshop No. 4, Faverges-de-la-Tour , France (Oct. 9, 2002), vol. 13, No. 2, pp. 93-312.*
Bhuvan Urgaonkar, Prashant Shenoy, Abhishek Chandra, and Pawan Goyal, Dynamic Provisioning of Multi-tier Internet Applications, Publication Date: Jun. 13-16, 2005, 12 Pages.*
Matt Welsh, David Culler, and Eric Brewer, SEDA: An Architecture for Well-Conditioned, Scalable Internet Services, ACM SIGOPS Operating Systems Review, vol. 35 , Issue 5, pp. 230-243, Dec. 2001.*
BEAWebLogic Server, BEA WebLogic Server Performance and Tuning, Release 8.1 Beta, Document Revised: Dec. 9, 2002, 95 Pages.*
BEAWebLogic Server®, Deploying Applications to WebLogic Server; Revised: Jul. 22, 2005; http://web.archive.org/web/20050901112708/http://e-docs.bea.com/wls/docs90/pdf/deployment.pdf; Archived Sep. 2005; Accessed Mar. 4, 2010; 28 Pages.*
Definition of J2EE deployment descriptor; http://java.sun.com/javaee/reference/glossary/; Accessed Mar. 5, 2010; 1 Page.*
Apache 1.3 Process Model Overview; http://web.archive.org/web/20041127125320/http://partner.fiberlink.com/manual/ibm/9atperf.htm; Archived Nov. 2004; Accessed Mar. 2010; 2 Pages.*

(Continued)

*Primary Examiner*—Hyung S Sough
*Assistant Examiner*—Kimberly Jordan
(74) *Attorney, Agent, or Firm*—Meyertons, Hood, Kivlin, Kowert & Goetzel, P.C.

(57) ABSTRACT

A system for automated concurrency configuration of multi-threaded programs comprises one or more processors and memory coupled to the processors. The memory stores program instructions executable by the processors to implement a resource management tool. The resource management tool is configured to determine respective target values for one or more concurrency configuration parameters to be set in a deployment of an application using an analytic model and a set of performance metrics obtained from the application (e.g., values of throughput, response times, and corresponding resource utilization measurements), and to deploy the application with the concurrency configuration parameters set to the target values.

17 Claims, 7 Drawing Sheets

OTHER PUBLICATIONS

"An Architecture for Highly Concurrent, Well-Conditioned Internet Services"; Welsh; Dissertation; University of California at Berkeley, CA; 2002.

"Xen; Users' Manual; Xen v2.0 for x86"; The Xen Team; University of Cambridge, UK; 2004.

"The Art and Science of Web Server Tuning with Internet Information Services"; Curry, et al; Microsoft Technet; Internet; 2005; http://technet.microsoft.com/en-us/library/bb742402(d=printer).aspx.

"BEA WebLogic Server: Performance and Tuning"; Users Guide; 2003; Internet; BEA Systems, Inc.; http://edocs.bea.com/wls/docs81/pdf/perform.pdf.

Cuomo, Gennaro, and Srini Rangaswamy; "IBM WebSphere Application Server 4.0 Performance Tuning Methodology"; White Paper; Internet; IBM Corporation; 2002.

* cited by examiner

AUTOMATED CONCURRENCY CONFIGURATION OF MULTI-THREADED PROGRAMS

BACKGROUND OF THE INVENTION

1. Field of the Invention

This invention relates to computer systems and, more particularly, to automated configuration and deployment of computer systems applications.

2. Description of the Related Art

Modern enterprise-level computer applications are typically designed to be multi-threaded in order to take advantage of the multiple processors available on typical enterprise servers and in clustered computing environments. Multi-threaded applications may also help improve overall performance in single-processor systems, where for example an application can switch from a blocked thread to a non-blocked thread to maintain optimal execution. However, the task of tuning applications for optimal execution on multi-processor and/or clustered systems has long been known to be a non-trivial and often expensive task. Enterprise application vendors usually have entire departments dedicated to tuning applications for marketing-related performance benchmarking. In addition, performance tuning specialists may also be deployed at customer sites, e.g., to ensure that a deployment of the enterprise application in a production environment meets desired performance goals.

Many applications are developed for deployment in platform-independent virtual machine environments, such as Java™ Virtual Machines or JVMs. For example, vendors such as IBM, BEA Systems, and the like provide Java™ 2 Enterprise Edition (J2EE)-compliant application servers, at which enterprise and web applications written using platform-independent programming languages such as Java™ may be deployed. Application servers may be configurable for use in clustered environments, where for example one or more instances of a JVM is executed at each node of a cluster of computer servers. Application servers may provide built in support for commonly used services such as transactions, security, database connectivity, etc., thus allowing application developers to focus on application functionality instead of redeveloping infrastructure services. Using platform-independent application server technology, enterprise application vendors may also be able to reduce development and testing costs associated with supporting applications on different hardware and operating systems. At least in theory, applications may only have to be developed and tested on one platform, instead of, for example, being ported to multiple platforms and tested separately for each platform. However, the problem of tuning applications for performance remains complicated even in application server environments.

Application performance may be sensitive to a variety of factors. In particular, the throughput and response time for service requests handled by an application may be sensitive to a number of tunable concurrency configuration parameters, such as the number of concurrent threads allocated for application use within a JVM of an application server. If the number of threads is set to too high a value, the application may incur substantial processing overhead due to frequent context switches, and may also use excessive memory. If the number of threads is set too low, the processors of the hardware platform at which the JVM is deployed may be underutilized. Current best practice guidelines provided by many vendors suggest that the optimal number of threads should be selected by observing the effect of different loads against the application using different values of the configuration parameters. Unfortunately, this typically involves expensive and time-consuming iterations of manually supervised testing. The amount of time and resources needed to identify suitable concurrency configuration parameters using such conventional techniques may be prohibitive, especially for automated provisioning environments where applications may have to be automatically migrated and deployed at different types of computing platforms.

SUMMARY

Various embodiments of systems and methods for automated concurrency configuration of multi-threaded programs are disclosed. According to one embodiment, a system comprises one or more processors and memory coupled to the processors. The memory stores program instructions executable by the processors to implement a resource management tool. The resource management tool is configured to determine respective target values for one or more concurrency configuration parameters to be set in a deployment of an application using an analytic model and a set of performance metrics obtained from the application (e.g., measured values of throughput, response times, and corresponding resource utilizations), and to deploy the application with the concurrency configuration parameters set to the target values. In one embodiment, the resource management tool is configured to receive as input a set of service level objectives (e.g., desired response times, desired throughput, desired cost, etc.), and to determine the concurrency configuration parameters in accordance with the service level objectives. Target values for a number of different concurrency configuration parameters may be determined in different embodiments, such as the number of concurrent threads of execution within a virtual machine process, the number of virtual machine processes at which the application is to be deployed, the mapping of virtual machines to servers (e.g., how many servers are to be deployed, and how many virtual machines are to be deployed at each server), etc. The selection of target concurrency configuration parameters and the deployment of the application may be completely automated in some embodiments, e.g., no administrator intervention may be required. The performance metrics used by the resource management tool may be gathered without extensive testing—e.g., in one embodiment, initial approximations of target values for configuration parameters may be obtained based on relatively short tests in a pre-production environment, and subsequent measurements obtained directly from a production environment may be used to further refine the values of the configuration parameters to more accurately reflect the production workloads.

The resource management tool may be configured to provide target values for the concurrency parameter settings for a number of different application deployment use cases. For example, in one embodiment the tool may be used in an initial deployment of the application, where the performance metrics are obtained in a test or development platform prior to the initial deployment to a production platform. In another embodiment, the tool may be used to migrate the application from one production platform to another, e.g., from a multi-processor system with N processors to another multiprocessor system with P processors, where P differs from N. The tool may also be used in making cluster reconfigurations in some embodiments, e.g., when additional nodes are deployed to a cluster to accommodate increasing workload levels. The deployment target platform (i.e., the server or cluster at which the application is to be deployed) may differ from the platform at which the performance metrics are obtained in a number of characteristics, such as processor vendor, processor architecture, processor speed, memory size, etc. When the application is to be moved to a platform employing a different processor type, a conversion factor derived from results of industry-standard benchmarks may be used to represent the different computing capabilities of the processors.

In some embodiments, the analytic performance model may be configured to use regression to derive quantities such as baseline utilization levels and/or per-service-request resource consumption. For example, in one embodiment, raw data representing samples of CPU utilization values for different concurrency levels may be supplied as input to the model. Using the raw data samples, the tool may be configured to generate a best-fit curve representing the variation of resource utilization with concurrency, e.g., on a graph in which CPU utilization is represented on the Y-axis and concurrency is represented on the X-axis. The intercept of the curve on the Y-axis may indicate a baseline value for CPU utilization indicating the amount of processing resources required for background tasks such as periodic cache refreshes, garbage collection, heartbeat mechanisms in clusters, etc., that may not be directly related to processing of service requests. The curve may also be used to determine per-request processing costs. Outlying data points (e.g., utilization measurements that may not be representative of steady state application behavior) may be discarded using statistical filtering techniques in some embodiments during the process of determining baseline and per-service-request resource consumption.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

Figure 1:
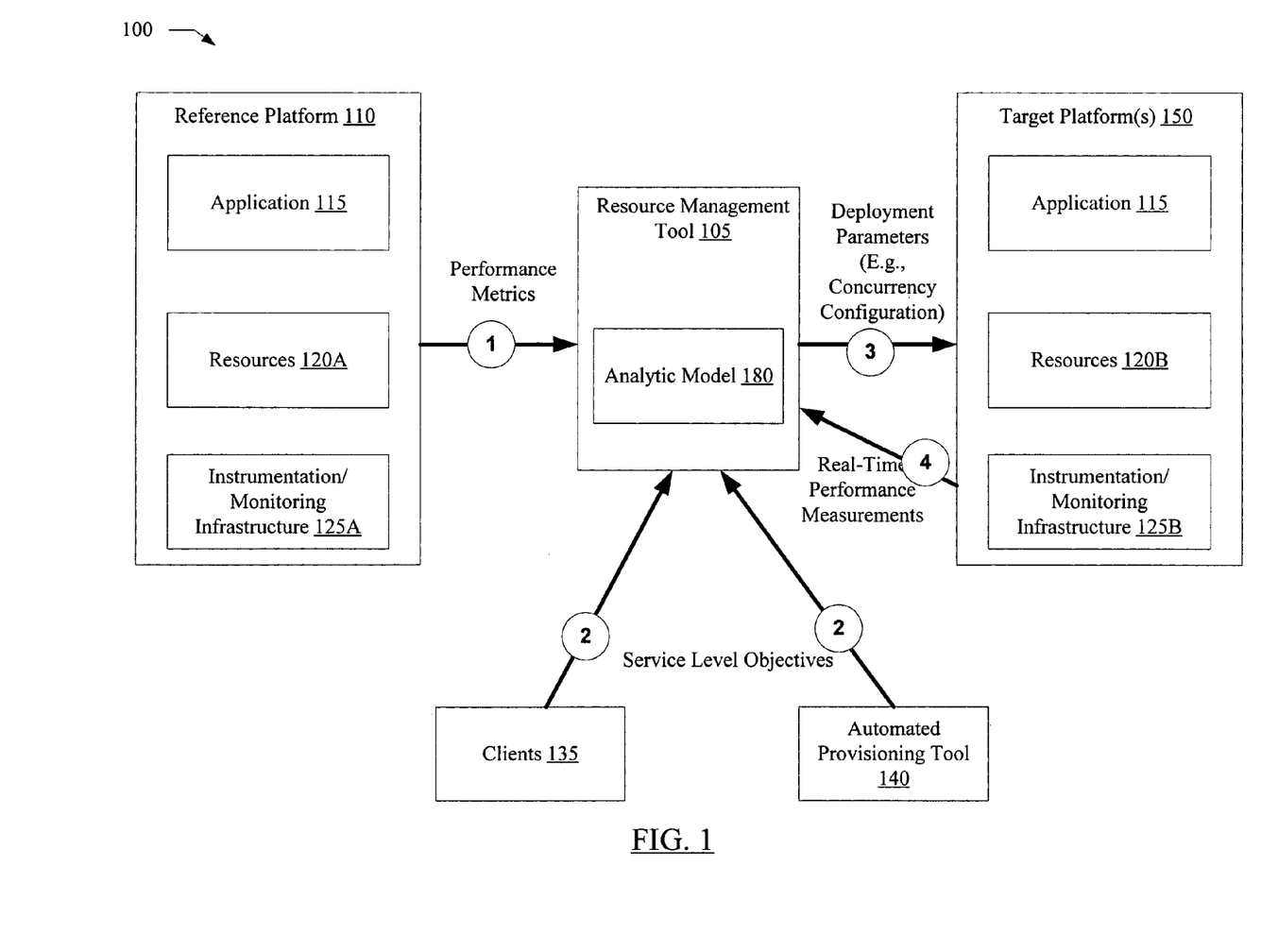
FIG. 1 is a block diagram illustrating one embodiment of a system.

FIG. 1 is a block diagram illustrating a system 100 according to one embodiment. As shown, system 100 includes a resource management tool 105, a reference platform 110, and one or more target platforms 150. Reference platform 110 and target platform 150 may each comprise one or more computer hosts comprising a respective set of resources 120 (e.g., resources 120A at reference platform 110 and resources 120B at target platform 150). A variety of different types of physical and logical resources may be available at each platform, such as one or more processors or CPUs (Central Processing Units), memory, network bandwidth, I/O devices such as disks, etc. In some embodiments, reference platform 110 and target platform 150 may also comprise a respective instrumentation/monitoring infrastructure 125 (e.g., infrastructure 125A at reference platform 110 and infrastructure 125B at target platform 150), which may be used, for example, to determine resource consumption for processing service requests processed by an application 115 executing at reference platform 110. Instrumentation/monitoring infrastructure 125 may comprise custom instrumentation tools (e.g., tools using binary-code instrumentation in embodiments where the application 115 is implemented using a programming language such as Java™ or C) and/or a variety of system-provided tools (e.g., sar, vmstat, iostat etc. on various Unix™-based platforms).

Various performance metrics obtained from one or more executions of application 115, such as, for example, the CPU utilization for different levels of throughput, may be provided to resource management tool 105, as shown by the arrow labeled "1" in FIG. 1. In some embodiments only raw performance data such as measured utilization, queue lengths, service request rates, etc., may be provided to resource management tool 105, while in other embodiments, at least some of the raw performance data may be processed before being provided to resource management tool 105 (e.g., utilization and throughput values may be averaged over specified time periods prior to being provided to resource management tool 105). Resource management tool 105 may be configured to utilize an analytic performance model 180 to determine target values of various concurrency configuration parameters for a deployment of the application 115 at a target platform 150. Target values for a number of different types of concurrency configuration parameters may be determined in different embodiments, such as the number of threads to be executed within a Java™ Virtual Machine (JVM) at which the application 105 is to be deployed at the target platform 150, the number of JVMs to be used, the mapping of JVMs to servers, etc., as described below in further detail. It is noted that the term "application" may be used generically herein to refer to an arbitrary collection of operations performed in response to client service requests received at a computing platform, not all of which may be performed using a single binary program. For example, on a given reference (or target) platform, the code of multiple different executable programs or modules may be invoked in some embodiments as part of an application 115, and a wide variety of service requests may all be considered part of the workload corresponding to the application 115. In some embodiments, resource management tool 105 may be configured to perform more detailed analysis, e.g., to provide separate sets of target values of concurrency configuration parameters for individual binary programs instead of a single set of values for the collection of binary programs to be executed on the target platform.

The performance metrics may be used as inputs to the model 180. In addition, in some embodiments, concurrency configuration parameters may be determined in the model in accordance with one or more service level objectives, e.g., a desired average or maximum response time per service request, a desired throughput rate expressed in service requests processed per unit time, a maximum cost, etc. Service level objectives may be provided to resource management tool 105, e.g., to be used as additional inputs to analytic model 180, from a number of sources in different embodiments, as indicated by the arrows labeled "2" in FIG. 1. (It is noted that the numbering of the arrows in FIG. 1 is not intended to indicate necessary sequentiality: e.g., resource management tool 105 may obtain service level objectives before obtaining performance metrics in some embodiments.) For example, in one embodiment, one or more clients 135 (e.g., administrators or other users of system 100) may provide service level objectives. In another embodiment, service level objectives may also or instead be provided by an automated provisioning tool 140, e.g., on the basis of a contractual agreement or a set of performance measurements or alerts obtained from a current deployment of an application or applications. For example, an automated provisioning tool 140 may be configured to proactively add servers to a cluster of servers at which a set of applications 115 is deployed as the workload on the cluster increases, and the automated provisioning tool 140 may utilize resource management tool 105 to determine settings of various parameters to be set at the added servers. The resource management tool 105 may be configured to automatically deploy the application 115 at one or more target platforms 150 with concurrency configuration parameters set to the target values, as indicated by the arrow labeled "3" in FIG. 1.

In some embodiments, after the application 115 has been deployed at a target platform 150, resource management tool 105 may be configured to obtain real time performance measurements from the deployed application, as indicated by the arrow labeled "4" in FIG. 1. Resource management tool 105 may use the real time performance measurements to track application performance over a period of time, e.g., to determine whether one or more of the concurrency configuration settings is to be changed or adjusted, and if settings are to be adjusted, to use the model to automatically determine new target values. Resource management tool 105 may be configured to dynamically change one or more concurrency configuration settings in response to the real time performance measurements, or in response to trends observed in the real time performance measurements. In some embodiments, as part of the adaptive response of the resource manager tool 105 to observed performance at one target platform 105, additional computing resources may be deployed for application 115, or, in some cases, the computing resources made available to application 115 may be reduced. Portions or all of the application 115 may be automatically migrated to a different target platform 150 in some embodiments in response to the outputs generated by the model 180.

Figures 2A, 2B:
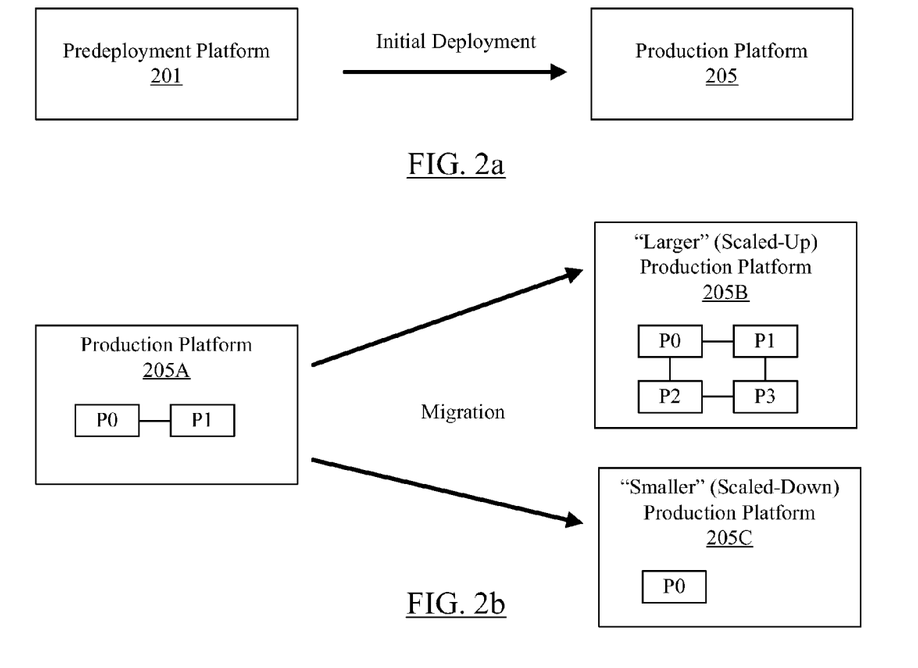
FIG. 2a-2c are block diagrams illustrating different use case scenarios in which a resource management tool may be utilized to make concurrency-related configuration choices, according to one embodiment.
Figure 2C:
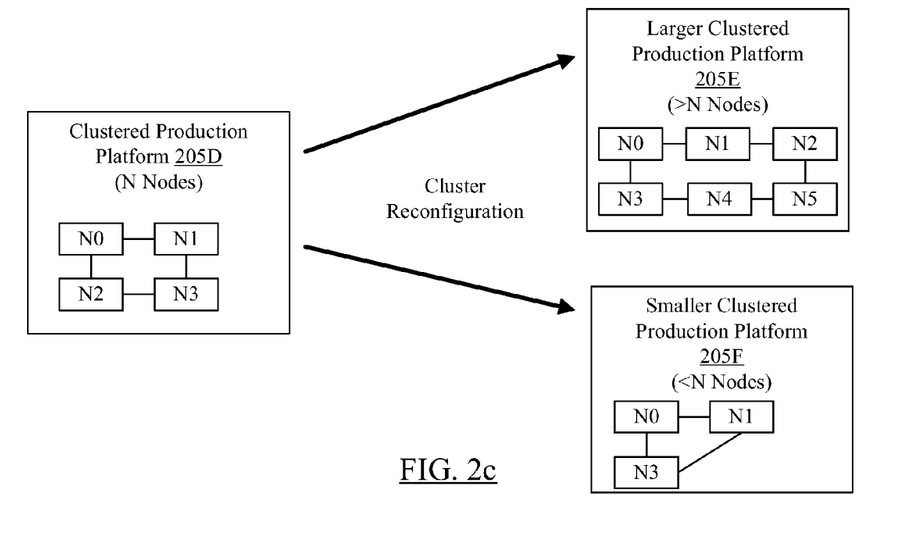

Resource management tool 105 may utilize analytic model 180 to make concurrency-related configuration choices in a number of different use case categories in some embodiments, such as initial deployment of applications to production environments, scale-up or scale-down scenarios, and scale-out scenarios, as shown in FIG. 2a—FIG. 2c. As shown in FIG. 2a, in some embodiments, concurrency parameter settings may be determined for an initial deployment of an application 115 at a production environment, e.g., in a transition from a pre-deployment platform 201 (such as a server in a software development laboratory or a quality assurance laboratory) to a production platform 205 (e.g., one or more servers at which external application clients may direct service requests, e.g., over the Internet). The computing platforms used in a software development or testing environment may differ in a number of characteristics from the platforms to be used for production, e.g., the production servers may include faster and/or more numerous processors. In one embodiment, e.g., in order to accurately factor in such differences, analytic model 180 may be configured to use one or more conversion parameters between the resource capacities of the different servers. The conversion parameters may be derived, e.g., from results of well-known industry standard performance benchmarks such as SPECjbb2000 (a version of the Standard Performance Evaluation Corporation's Java Business Benchmark) or various TPC (Transaction Processing Council) benchmarks run on reference platform servers and on target platform servers.

In some embodiments, as shown in FIG. 2b, resource management tool 105 may be used when an application 115 deployed to one target platform is to be migrated to another target platform, e.g., in response to consolidation requirements, changed budgets, availability of new hardware in a data center, changed workload levels, etc. If the application 115 is moved to a faster or more powerful server (e.g., from a production platform 205A with two processors P0 and P1 to production platform 205B with four processors P0, P1, P2 and P3), the transition may be referred to as a "scale-up" transition. It is also possible that the application 115 may be moved to a server with less computing power (e.g., from platform 205A to platform 205C with just one processor P0), e.g., in an environment where demand for the services provided by the application is decreasing and/or cost pressures are increasing; such a transition my be referred to as a "scale-down" transition. In either case (i.e., whether the transition is a scale-up or a scale-down), resource management tool 105 may utilize model 180 to determine appropriate concurrency configuration settings for a new target platform 150 and/or for adjusted service level objectives.

In environments where target platforms 150 may include clusters of servers, as illustrated in FIG. 2c for one embodiment, resource management tool 105 may be utilized to determine concurrency parameter settings for "scale-out" transitions, where additional nodes are added to a cluster (or for "scale-in" transitions, where some existing nodes may be decommissioned). For example, clustered production platform 205D comprising four cluster nodes N0-N3 may be enlarged to include two more nodes N4 and N5 as in platform 205E, or the number of nodes may be reduced as in platform 205F. Clustering may add an additional level of complexity to the problems of performance tuning and capacity planning compared to single-node deployments. Since many popular enterprise applications may not originally have been designed for clustered environments, and some applications are sometimes not thoroughly tested in large cluster configurations prior to release due to testing costs, deployment to clustered platforms often exposes unexpected concurrency limitations and/or non-linear behaviors. The analytic performance tool 180 used by resource management tool 105 may be configured to take clustering overhead into account (e.g., by determining baseline utilization levels for each node in a clustered environment) in determining target values of various parameters.

It is noted that in addition to the exemplary use cases illustrated in FIG. 2, resource management tool 105 may also be used during application transitions that incorporate a combination of the use case features illustrated in FIG. 2 and/or additional features. For example, in one embodiment, resource management tool 105 may be utilized to generate concurrency configuration parameter settings for a migration from a non-clustered production platform 205A to a clustered platform 205K that utilizes a set of more powerful servers (e.g., where each server includes more processors than platform 205A), thus combining the scale-up with scale-out. In another embodiment, resource management tool 105 may also be configured to take possible failures into account when determining concurrency configuration parameters, e.g., to ensure that a clustered production platform is capable of withstanding at least temporary outages of a specified number of nodes, the tool may incorporate one or more factors for expected failovers. For example, 10% of the computing capacity of a target platform may be set aside for possible failure recovery in some embodiments, so that the total available CPU utilization for non-failure-related operations may be reduced by 10%, e.g., to 90% instead of 100%. In some embodiments, resource management tool 105 may modify concurrency configuration parameters on the same platform from which the performance metrics were obtained, e.g., without changing the set of resources 120 available for the application 115.

In some embodiments, the analytic performance model 180 may be configured to utilize regression techniques and/or statistical filtering. For example, in one implementation, the performance metrics gathered on a reference platform may include a set of application throughput values (e.g., for different numbers of concurrently active requests) and corresponding resource utilization levels (e.g., CPU utilization, memory utilization, disk utilization, network utilization, etc.). Using the raw performance metrics, analytic performance model 180 may generate a best-fit approximation representing the relationship between resource utilization and concurrency. Such a regression technique may be used to derive a baseline resource consumption level, e.g., a background level of resource usage that would occur even in the absence of client service requests, as well as a measure of per-request resource utilization. For example, if the number of concurrently handled service requests were represented on an X-axis of a graph, the corresponding CPU utilization levels at a reference platform 110 were represented on the Y-axis of a graph, and a best-fit curve were generated based on the raw data to represent the variation in CPU utilization as a function of concurrency, the intercept of the curve on the Y-axis may be used as an approximation of a baseline CPU utilization level. The intercept on the Y-axis corresponds to the utilization level at zero concurrency, and may be indicative of the resource usage devoted to background tasks like cluster membership maintenance messages, cache refreshes, garbage collection, etc. that are performed regardless of the external service request load. The curve may also be used to compute per-request utilization: e.g., the difference in utilization between a concurrency level of N and a concurrency level of (N+1) may indicate the resources consumed for one concurrent service request. Various algorithms may be used to generate the best-fit curve in different embodiments, e.g., a least-squares algorithm may be used in some implementations. It is noted that the model 180 may not be configured to actually generate a graph in some embodiments, but may only be configured to perform the calculations necessary to derive the baseline values and the per-request utilization values. In some implementations, the analytical model 180 may also be configured to filter out outlying values among the raw metrics, e.g., by removing extremely high or extremely low data values that appear to be outside a range of "reasonable" values based on statistical filtering. In some embodiments, instead of utilizing regression techniques, a simpler approximation technique may be employed to determine per service request resource usage—e.g., total utilization may be divided by the corresponding total number of concurrent requests being serviced to estimate per-request resource utilization as a first approximation.

In one embodiment, resource management tool 105 may be configured to identify or rank various resources in order of criticality, e.g., to identify which specific resource type among a set of resource types such as CPUs, memory, disk, and network is likely to become a bottleneck first as workload increases. For example, using the metrics obtained from reference platform 110 for various monitored resources, resource management tool 105 may deduce that a particular application is likely to be CPU-bound, i.e., that as the number of concurrent service requests for the application increases, throughput may flatten out because CPUs become close to 100% utilized first, before any other resources are saturated. CPUs may be identified as the most critical resources in such a case. In some implementations, in addition to providing concurrency configuration settings, resource management tool 105 may be configured to provide a report or notification indicating the ranking of resources by criticality, or an identification of the key critical resource or resources. Identifying critical resources may be especially important in a scale-up environment if initial application configuration parameters may not be modifiable after an application is started without restarting the application. In this kind of environment, an application might be initially started on a small server with fewer processors and less memory, and later migrated to a large server with more processors and more memory as the workload increases. Accordingly, the application may be configured upon initial startup so that it can eventually take advantage of the additional resources available on the larger server, without exceeding the resources available when the application is running on the smaller server. For example, Java™ applications typically require that the maximum application heap memory size be configured at startup time. If a Java™ application is to be migrated from a smaller server to a larger server after it starts up, then the maximum application heap memory size configured on the smaller server should be set large enough to support a potential increase in the number of threads that may be used on the larger server relative the number of threads used on the smaller server. However, if the size of the heap memory allocated by the application when it is running on the smaller server is set too large (e.g., to a value greater than the physical memory available on the smaller server), then the application may perform poorly on the smaller server (e.g., because memory references and garbage collection may cause an excessive amount of virtual memory paging). In this example, the ranking of application memory size as a critical resource can be used to preferentially select smaller servers with enough memory to support scale up migration to larger servers without restarting the application.

Resource management tool 105 may provide an interface allowing an administrator or user to list a set of resources or resource types to be monitored and considered during the determination of target values of concurrency configuration parameter settings in one embodiment. In some implementations, resource management tool 105 may be operable to select (e.g., from a default set of resource types or from a set of resource types specified by a user) one or more resource types for which metrics are to be used in determining the target values of the parameters. For example, if metrics obtained from reference platform 110 indicate that performance of a particular application is relatively insensitive to a particular type of resource (e.g., an application may be relatively insensitive to disk resources because sufficient read and write caching is provided at various levels in a storage hierarchy), resource management tool 105 and/or analytical model 180 may be configured to ignore metrics pertaining to that specific resource when deriving target concurrency configuration parameter values.

Various types of service level objectives may be provided as input to resource management tool 105 in different embodiments. For example, in one embodiment, resource utilization may be explicitly related to user costs, e.g., users may be billed in a utility computing environment based on the number of "processor-hours" (where each processor-hour represents a use of a particular type of processor or CPU for an hour). In such an embodiment, service-level objectives may include a total available budget amount, and resource management tool 105 may derive one or more target values of concurrency configuration parameter in accordance with the budget amount (e.g., if a budget is limited to 100 processor-hours per week, resource management tool 105 may be configured to determine target configuration settings values to ensure that throughput is maximized while costs do not exceed the budgeted amount during a given week). Alternatively, given a desired response time and desired CPU utilization as service level objectives, resource management tool 105 may derive target concurrency parameter settings, e.g., a number of JVMs and the number of threads to be dedicated to application use within each JVM that will support the desired objectives on a target platform 150. If information relating computing resources to user costs are available, resource management tool 105 may also provide an estimate of the costs of supporting the specified service level objectives.

In some embodiments, given a throughput value and a response time value, analytic model 180 may utilize Little's Law to determine a setting for a concurrency level parameter. In the context of service requests being handled at a computing platform, Little's Law may be stated as: the average number of service requests at the platform (e.g., the target concurrency setting) is the product of the average rate at which requests are completed (throughput) and the average time each request spends in the platform (response time).

Vendor supplied "best practice" upper and lower bounds for various concurrency configuration parameters may be used by resource management tool 105 in some embodiments. For example, various application server vendors such as the IBM corporation and BEA Systems may provide guidelines indicating for example the maximum number of processors that should be utilized for a single JVM of a particular application server product version, or the maximum number of concurrent threads that a JVM can effectively support. The application server vendors may derive such guidelines, for example, based on extensive performance testing and/or benchmarking, and may provide the guidelines in product-specific tuning guides or administration manuals. If the results of the target concurrency configuration parameter settings computed using analytic model 180 happen to fall outside recommended best practice bounds, resource management tool 105 may be configured to adjust the settings and recommended configurations accordingly. For example, if an application server vendor's tuning guide states that no more than 64 threads should be deployed within a single JVM, and the analytic model 180 determines that a total of 150 threads may be required to meet specified service level objectives, in one embodiment resource management tool 105 may deduce that three JVMs with 50 threads each should be deployed (e.g., so that the best practice upper bound of 64 threads per JVM is not exceeded). The best practice upper and lower bound values for various parameters (e.g., thread pool sizes, JVMs per processor, etc.) may be provided as inputs to resource management tool 105, along with other configuration information such as the number of CPUs available at the target platform and the reference platform, the relative speed of the CPUs, the amounts of memory available per server at the reference and target platforms, etc. Various other parameters may be supplied as input to resource management tool 105 in different embodiments, including, for example, expected latencies or delays related to application deployment (i.e., time taken to actually deploy an application 115 on a newly installed target platform 150, independent of execution time of the application in response to service requests). Resource management tool 105 may use parameters related to deployment delays, for example, in making proactive provisioning decisions in response to detected trends in application performance in some embodiments, as described below in further detail. In some embodiments, concurrency related configuration parameters may be determined separately for different classes or pools of resources: for example, within a particular JVM, one parameter may govern the number of threads to be used for processing application workloads, another parameter may govern the number of threads to be used for back-end database connectivity, another parameter may govern the number of threads used to implement a messaging service such as JMS (Java™ Messaging Service), etc., and resource management tool 105 may be configured to determine separate target values corresponding to each pool.

In one specific implementation, analytic tool 180 may be configured to derive target values of various concurrency configuration parameters for JVM deployment in a multi-step process in which desired service request response time is provided as a service level objective. In a first step, for example, the target platform's available CPU utilization may be determined—e.g., if an upper limit of 75% on the CPU utilization of the target platform is specified, and the target platform comprises eight CPUs, the available utilization may be set to 0.75×8=6 CPUs (i.e., 600% of one CPU). A best practice value of the number of CPUs per JVM may be used to determine the number of JVM instances to be deployed at the target platform—e.g., if the JVM vendor indicates that for best performance, a single JVM process should be deployed at no more than 4 CPUs, the analytic model may 180 determine that two JVM instances should be deployed on the eight CPUs available in the above example. In a next step, the amount of CPU utilization available per JVM instance may be calculated: e.g., by dividing 6 CPUs of available utilization by 2 JVM instances, a total of 3 CPUs worth of utilization may be calculated as being available for each JVM instance. The available CPU utilization per instance may then be adjusted for the speed of the target processors relative to that of the reference platform processors. A baseline CPU utilization value (e.g., derived using regression as described above) may then be subtracted from the adjusted available CPU utilization to take background processing load into account. The achievable throughput may then be calculated by dividing the remaining utilization by the per-request CPU utilization (which may also have been derived using regression on raw performance metrics obtained from the reference platform). Using response time objectives and the calculated throughput, the target number of threads per JVM may then be calculated using Little's Law. If the target number of threads falls outside the vendor's best practice bounds, the number of JVM instances may be adjusted so that the number of threads per JVM does not violate the best practice guidelines.

Similar multi-step calculations may also be used when resources other than processors (e.g., memory, network or disk resources) are considered by resource management tool 105 in different embodiments. In one embodiment, resource management tool 105 may be configured to use analytic model 180 to perform separate calculations for different resources, and to combine the recommendations reached for the different resources to derive a final set of target values for concurrency configuration parameters. E.g., if calculations based on CPU resources alone result in a first target value V1 for a given concurrency parameter, and calculations based on memory resources alone result in a second target value V2 for the concurrency parameter, in one embodiment resource management tool 105 may be configured to select a particular target value (V1 or V2) based on which of the resources is more likely to become the bottleneck resource.

In one embodiment, resource management tool 105 may be configured for use in a bulk provisioning environment, where for example dozens or hundreds of servers are to be configured identically for deployment of an application or a group of applications. In one such embodiment, a "golden" install image (e.g., including an operating system as well as various applications) may be copied to each of the target servers from an image repository. After resource management tool 105 has determined target values of various concurrency configuration parameters, the golden install image may be modified accordingly—e.g., if a configuration file contains the settings, the copy of the configuration file in the golden install image may be modified to match the target values, so that each target server is configured with the parameter values determined by the resource management tool 105.

Figure 3:
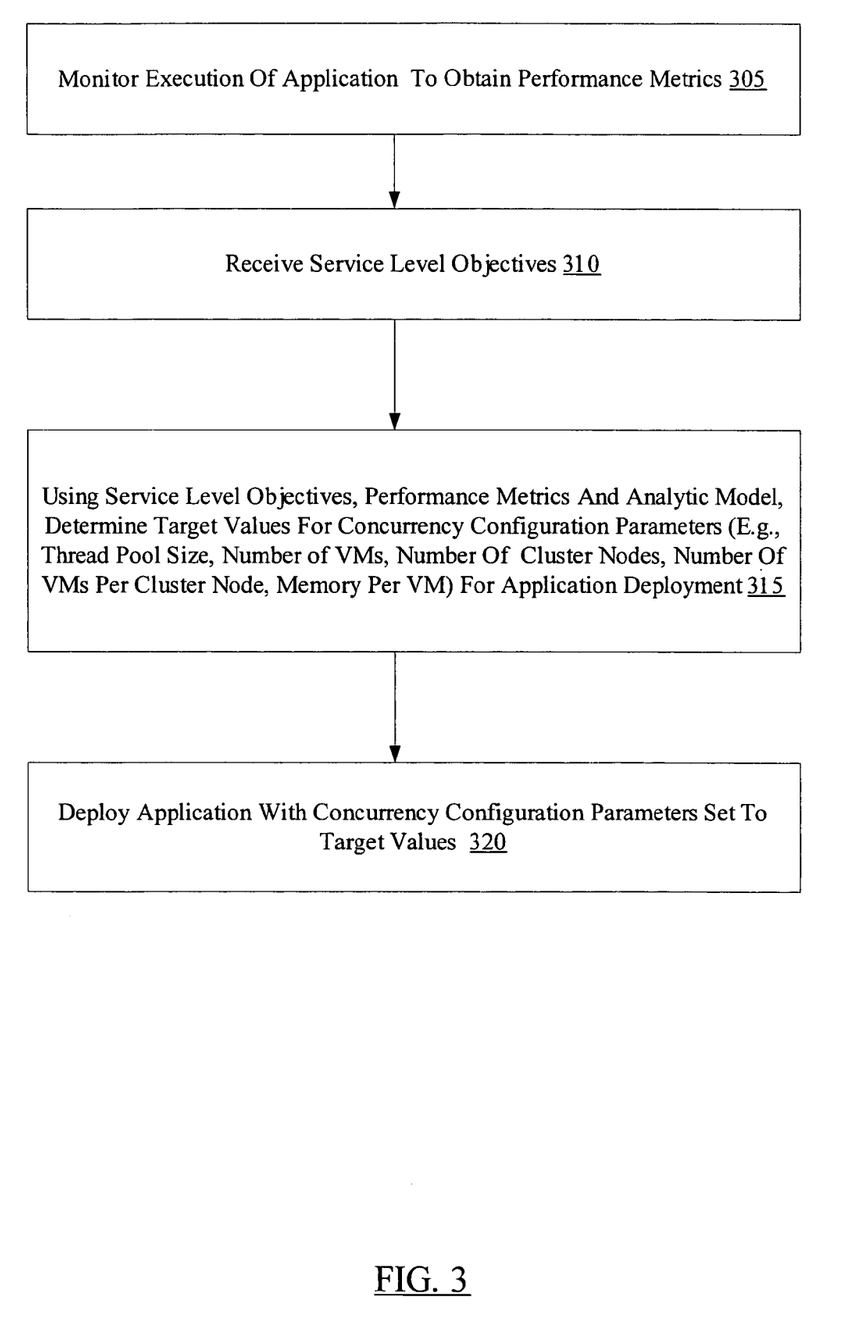
FIG. 3 is a flow diagram illustrating aspects of the operation of a resource management tool, according to one embodiment.

FIG. 3 is a flow diagram illustrating aspects of the operation of resource management tool 105, according to one embodiment. As shown in block 305 of FIG. 3, resource management tool 105 may be configured to monitor an execution of application 115 on a reference platform 110, e.g., in a test environment or in a production environment, depending on whether the application has already been deployed to production. A monitoring/instrumentation infrastructure 125 (e.g., including custom instrumentation technologies, existing system-provided performance tools, and or performance hooks or APIs provided within applications 115) may be used to gather the performance data for resource management tool 105. In some embodiments, standards-based APIs (e.g., the Java Virtual Machine Profiler Interface (JVMPI)) may be used to implement at least a portion of a monitoring/instrumentation infrastructure 125. In some embodiments, where for example application 115 is deployed at one or more JVMs, custom binary code instrumentation may be used to obtain various performance metrics on a per-service-request basis: e.g., the binary code instrumentation may be configured to identify service request initiation and termination events and to correlate resource usage with the specific service requests processed and/or with each thread used in servicing the request.

The resource management tool 105 may be configured to receive service level objectives (e.g., response time constraints, cost constraints, desired throughputs, desired utilization limits, etc.) for a particular deployment or redeployment of the application (block 310 of FIG. 3). The service level objectives may be supplied as input parameters to the tool 105, e.g., using an input parameter file or a graphical user interface (GUI). In some embodiments, parameters describing computing capabilities (e.g., number of CPUs, speed of CPUs, memory size, etc.) of one or more target platforms 150 may also be supplied using a similar input interface; in other embodiments, resource management tool 105 may be configured to automatically obtain various configuration details of target platforms from a database. Using the performance metrics obtained from the reference platform, the analytic model, and the service level objectives, the resource management tool 105 may be configured to determine target values for one or more concurrency configuration parameters, as shown in block 315 of FIG. 3. The concurrency configuration parameters may include, for example, a thread pool size for one or more virtual machines such as JVMs, a number of application processes or virtual machine instances, a number of target servers, a number of processors per target server, memory per virtual machine, application processes or virtual machines per target server, etc.

In some embodiments, the resource management tool 105 may be configured to automatically deploy the application with the concurrency configuration parameters set to the target values at one or more target platforms 150 (block 320). In other embodiments, the resource management tool 105 may be configured to send a notification comprising the target values to an administrator, and the administrator may then determine whether to deploy the application in accordance with the recommendations of the resource management tool 105. In some implementations, even if the resource management tool 105 is capable of automatically deploying the application at target platforms, the tool may be configured to obtain an indication of approval from an administrator before actually deploying the application. For example, an e-mail or text message may be sent to an administrator indicating a potential deployment of the application by the resource management tool 105, and the tool may be configured to wait until a response to the message indicating an approval of the deployment is received from the administrator before deploying the application.

Figure 4:
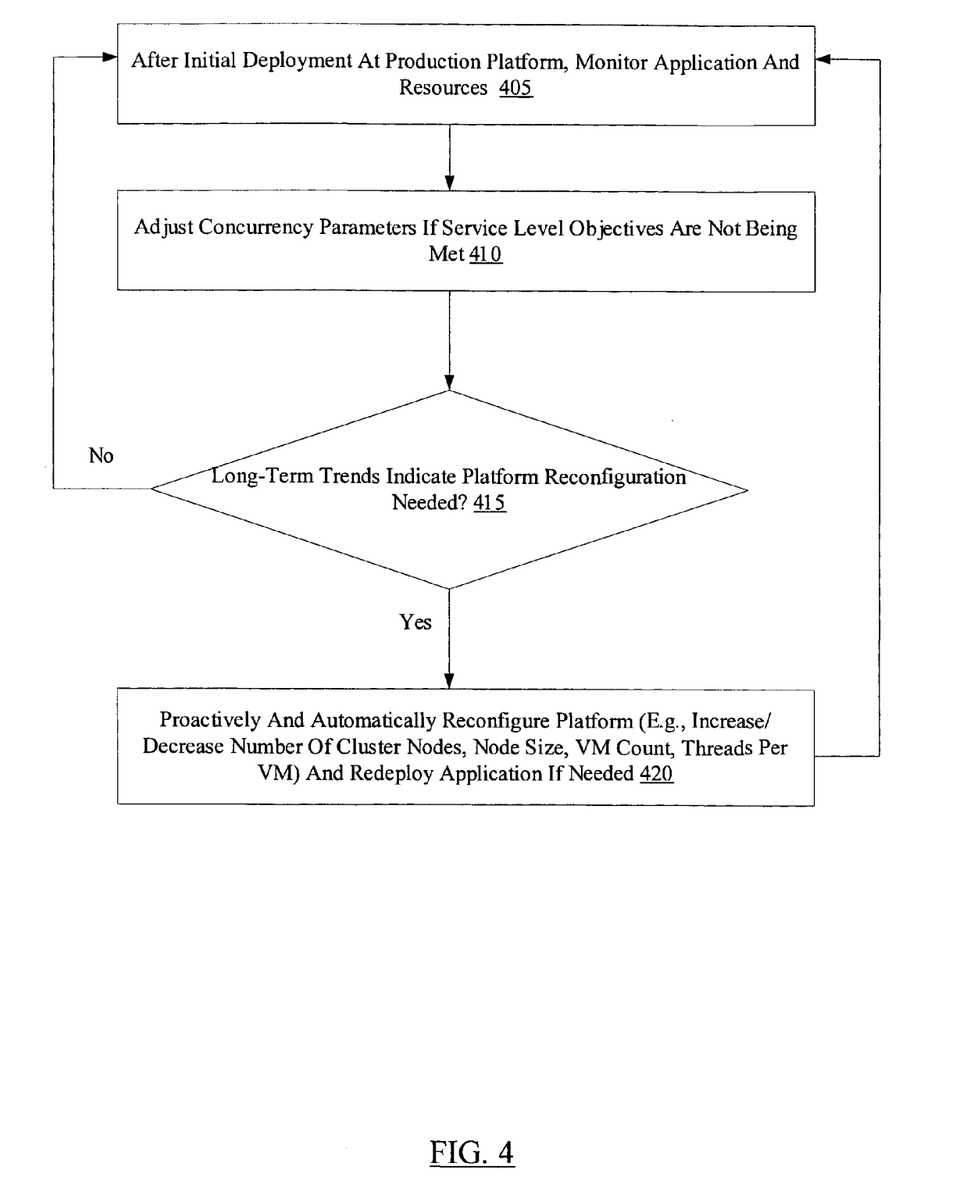
FIG. 4 is a flow diagram illustrating further aspects of the operation of a resource management tool after an initial deployment of an application at a production platform, according to one embodiment.

FIG. 4 is a flow diagram illustrating further aspects of the operation of resource management tool 105 after an initial deployment of application 115 at a production platform, according to one embodiment. As shown in block 405, the resource management tool 105 may be configured to monitor the application 115 and various resources 120 at the production platform, e.g., via an instrumentation/monitoring infrastructure 125 as described earlier. If the monitoring indicates that the service level objectives are not being met, e.g., if the average response time exceeds a desired value, the resource management tool 105 may be configured to adjust one or more concurrency configuration parameters (block 410). In some embodiments, one or more parameters may be adjusted while the application 115 remains running, while in other embodiments, an application or a JVM at which a portion of the application is deployed may have to be restarted for modified parameters to take effect. In some clustered embodiments, parameters may be adjusted in a staged or cascaded manner so as not make the entire application unavailable at any given time. E.g., a JVM at a first node may be restarted after parameter modification while JVMs at three other nodes remain operational, so that the load typically handled by the first JVM can be distributed in a balanced manner across the operational nodes; then, after the first JVM is operational, a second JVM may be restarted to make modified parameter values take effect, and so on.

In some embodiments, resource management tool 105 may be configured to detect long-term trends (e.g., over days or weeks) in application performance and resource consumption. The long-term trends may in turn be used to detect whether the application is likely to violate service level objectives in the future (as indicated in decision block 415 of FIG. 4). A band of acceptable values and actionable threshold values for metrics such as throughput may be specified via input parameters to resource management tool 105. For example, the parameters may indicate that while throughput between a maximum of 100,000 requests per hour and a minimum of 10,000 requests per hour is acceptable, reconfiguration of the system may be recommended if the throughput rises above 90,000 requests per hour and throughput trends indicate that the service demand is likely to continue to increase, or if the throughput falls below 11,000 requests per hour and throughput trends indicate that the service demand is likely to decrease further. In response to determining that reconfiguration is needed based on analysis of long term trends, resource management tool 105 may be configured to proactively and automatically reconfigured the target system (block 420): e.g., by increasing/decreasing the number of cluster nodes, migrating the application 115 to a larger or smaller server, changing a number of virtual machines at which the application is deployed, changing the values of concurrency configuration parameters such as threads per JVM, etc. The application may be redeployed on one or more servers as needed. In some embodiments, resource management tool 105 may be configured to factor in parameters such as the time taken to install/set up new servers (e.g., when nodes are to be added to a cluster) and the time taken to deploy the application in determining when the platform should be reconfigured. For example, if according to the procedures in place at a particular data center it takes a day to acquire and physically position one or more new nodes for a cluster, and it takes an additional six hours to deploy an application after the new nodes have been positioned and powered on, resource management tool 105 may be configured to ensure that a decision to enlarge a cluster with additional nodes is made sufficiently early so that the set-up delay of a day and six hours does not result in service level thresholds being violated.

Figure 5:
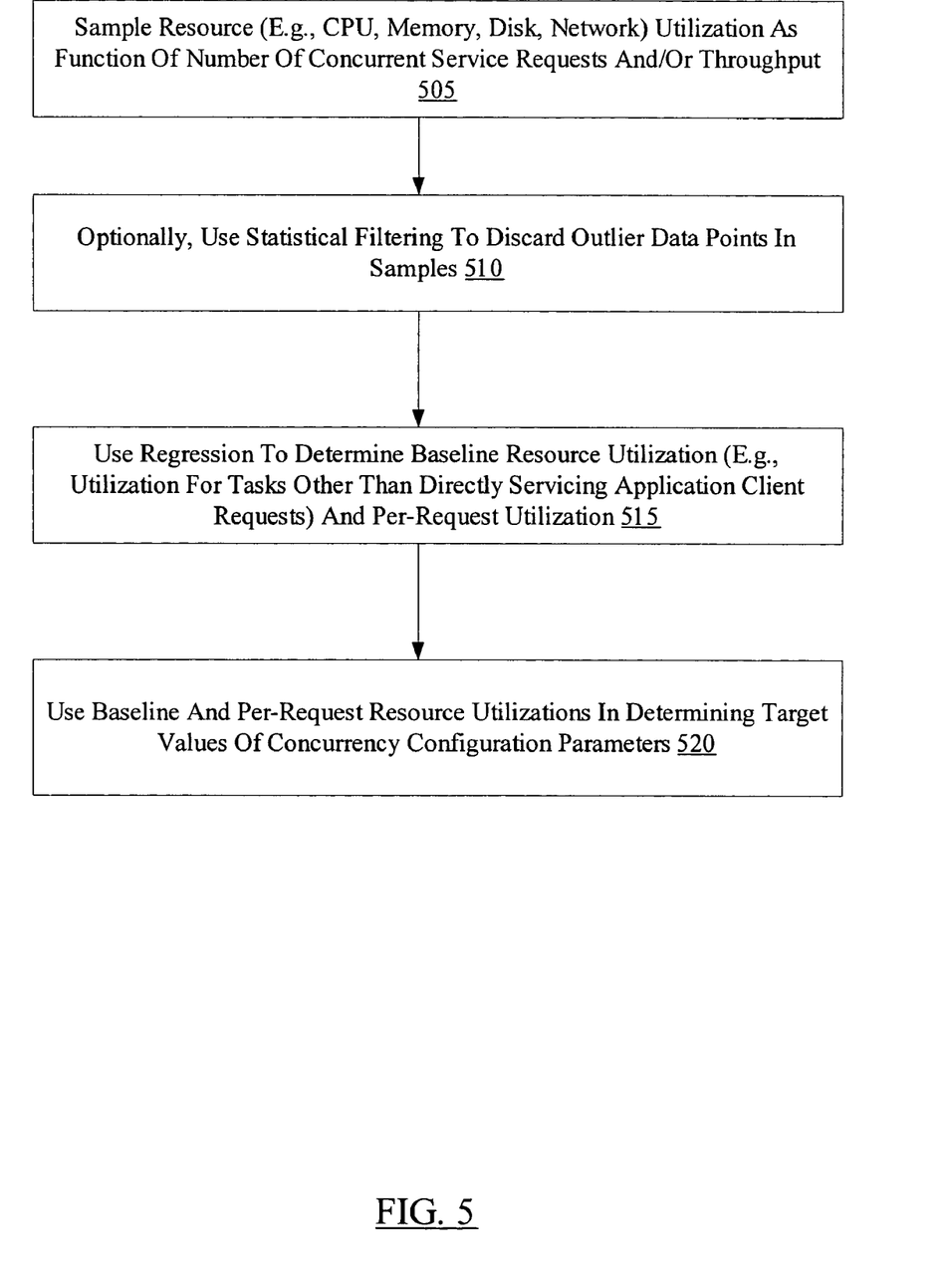
FIG. 5 is a flow diagram illustrating aspects of the operation of a resource management tool in an embodiment where an analytical performance model is configured to utilize regression to obtain baseline and per-request resource utilization values.

FIG. 5 is a flow diagram illustrating aspects of the operation of resource management tool 105 in an embodiment where analytical performance model 180 is configured to utilize regression to obtain baseline and per-request resource utilization values. Resource management tool 105 may be configured to sample utilization levels of one or more resources (e.g., CPU, memory, disk, and/or network bandwidth) as a function of application throughput (block 505). For example, a multi-user test representative of the expected mix of user requests may be run at several different concurrency levels on a reference platform 110, and utilization levels for various resources for each of the test runs may be gathered. Optionally, in one embodiment, statistical filtering techniques may be used to discard outlier data points (block 510). Baseline utilization values (i.e., resource utilization levels that are not directly related to processing incoming service requests, but may be related to background tasks such as periodic cache refreshes, garbage collection, etc.), as well as per-service-request resource utilization values may be determined using regression (block 515). For example, if the number of concurrently handled service requests were represented on an X-axis of a graph, the corresponding CPU utilization levels at a reference platform 110 were represented on the Y-axis of a graph, and a best-fit curve were generated to represent the variation in CPU utilization as a function of concurrency, the intercept of the curve on the Y-axis may be used as an approximation of a baseline CPU utilization level. The curve may also be used to compute per-request utilization as described earlier. The derived baseline and per-request resource utilization values may then be used for determining target values of various concurrency configuration parameters (block 520), such as the number of threads per JVM, the number of JVMs, the mapping of JVMs to servers, etc. It is noted that in some embodiments, tests may be run for relatively short periods of time on reference platforms 110, in order to obtain first approximations for various baseline and per-request utilization values to be used in determining target parameter values for an initial deployment; once the application has been initially deployed in a production environment, more realistic baseline and per-request utilization values may be obtained over time from measurements taken in the production environment itself, and model parameters may be adjusted accordingly. Baseline and per-request utilization values may be refined and improved over time as more and more production measurements are factored in, thus enhancing the validity and accuracy of the calculations of concurrency configuration parameters made in the model 180. If and when an upgraded version of an application 115 is deployed into production in one embodiment, where the upgraded version may have slightly different performance characteristics, the resource management tool 105 may quickly detect the changes in the performance characteristics based on continuous monitoring in the production environment, and may automatically adjust parameter values if needed.

In some embodiments, resource management tool 105 may be configured to track the occurrence of certain system-initiated events external to the application 115 that may affect measured utilization and/or application performance. For example, in embodiments where application 115 is executed on platforms employing garbage collection for automated memory management, a garbage collection event may temporarily significantly affect application throughput as well as memory and CPU utilization. Certain JVMs, may, for example, schedule so-called "stop-the-world" garbage collection events from time to time, during which application activity is paused and only garbage collection operations are performed. If one or more of the measurements recorded by resource management tool 105 happen to coincide with garbage collection events, those measurements may not represent steady-state application behavior. Accordingly, in some embodiments, resource management tool 105 may be configured to detect garbage collection events (e.g., using interfaces provided by JVMs, or as a result of deductions based on observed values of utilization, throughput etc.) and discard measurement data points that happen to coincide with garbage collection events. In one embodiment, when determining baseline and per-request values for memory utilization, resource management tool 105 may be configured to use regression only on memory utilization data gathered between successive garbage collection events to ensure that the release of memory during garbage collection does not skew the calculations. For example, after a garbage collection event completes, JVM heap memory size may be sampled as a function of concurrency until the next garbage collection event occurs, and only the heap size values recorded between the garbage collection events may be used to determine the baseline and per-request heap memory consumption. It is noted that multiple sets of heap size samples may be taken to obtain a representative set of heap memory consumption values, where each sample set is gathered between a respective pair of garbage collection events. In some embodiments where the scheduling of garbage collection events may be controlled by configurable parameters, resource management tool 105 may be configured to schedule garbage collection events to support the gathering of a large number of heap usage samples between successive garbage collections. In one embodiment, resource management tool 105 may be configured to force garbage collection events at specific points in time to aid in the gathering of a desired number of heap size samples.

Figure 6:
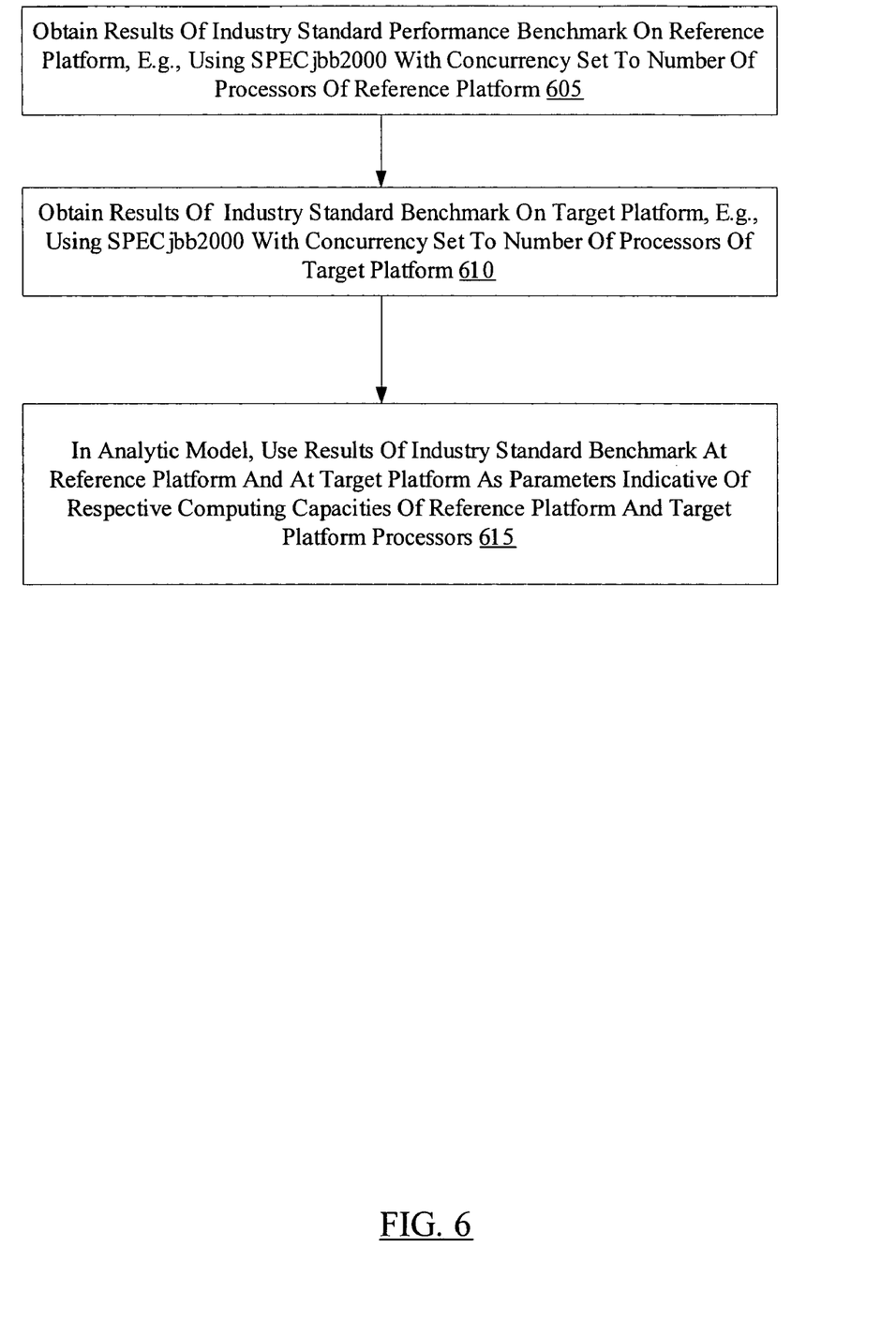
FIG. 6 is a flow diagram illustrating aspects of the operation of a resource management tool in an embodiment where results of industry standard benchmarks may be used to derive conversion factors between the computing capacities of reference and target platforms that utilize different types of processors

As noted earlier, a target platform 150 for application 115 may differ from a reference platform 110 in a number of characteristics, such as total processing capacity, total memory, number of cluster nodes, number of processors, processor architecture, and processor vendor. FIG. 6 is a flow diagram illustrating aspects of the operations of resource management tool 105 in an embodiment where results of industry standard benchmarks may be used to derive conversion factors between the computing capacities of the reference and target platforms that utilize different types of processors (e.g., processors with different architectures, different clock speeds, and/or different memory hierarchy organizations such as Level 1 and Level 2 cache sizes and cache latencies, etc.). An industry standard benchmark such as SPECjbb2000 may be run on the reference platform 110 with a certain concurrency workload setting, e.g., the number of warehouses defined in the SPECjbb2000 benchmark may be set to the number of processors available at the reference platform (block 605). The same industry standard benchmark may also be run on the target platform 150, with the concurrency parameters adjusted to reflect the number of processors available at the target platform, e.g., with the number of SPECjbb2000 warehouses set to the number of processors available at the target platform (block 610). The throughput results of the industry standard benchmark at the two servers may be used in the analytic model 180 as indicators of the respective computing power of the processors in use at the reference and target platforms respectively (block 615). It is noted that if benchmark workload parameters (such as the number of warehouses in the case of SPECjbb2000) are not adjusted to take the numbers of processors at the two platforms into account, the throughput results may not represent a fair comparison (because, for example, the throughput may be limited by the choice of workload parameter, rather than by the underlying processing capacity) in some embodiments. Accordingly, parameters for the industry standard benchmarks should be selected carefully, preferably with the help of an expert on the benchmark. When industry-standard benchmarks results are not available, other conversion factors such as the ratio of the clock speeds of the processors may be used as approximations of relative processing capacity in some embodiments. Techniques similar to those illustrated in FIG. 6 may be used to derive conversion factors for resources other than processors in some embodiments: e.g., a standard disk I/O benchmark may be used to derive disk performance conversion factors, and a network throughput test may be used to derive network performance conversion factors.

Figure 7:
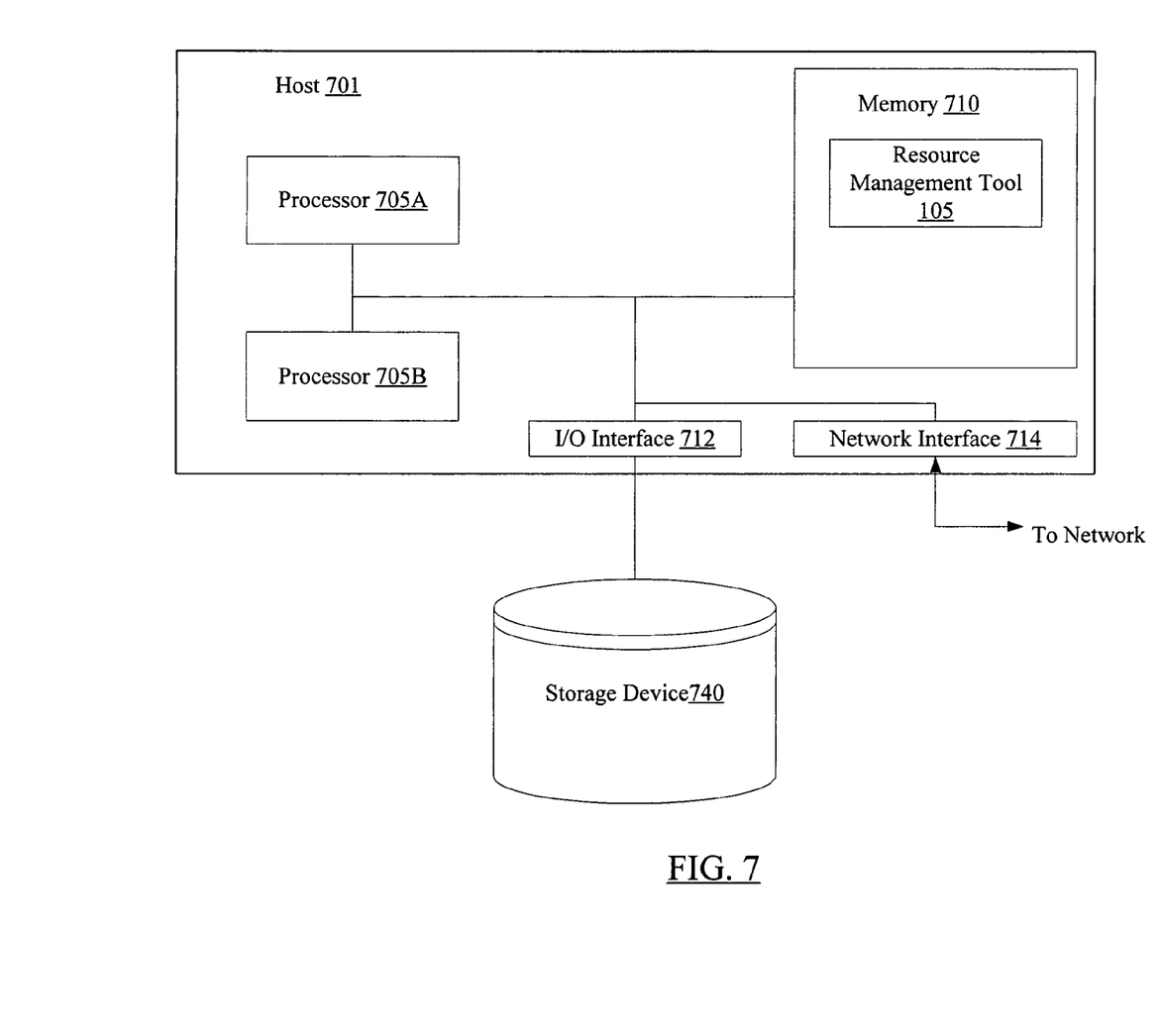
FIG. 7 is a block diagram illustrating constituent elements of a computer host, according to one embodiment.

FIG. 7 is a block diagram of a computer host 701 that may be deployed as needed as a reference platform 110 or a target platform 150, according to one embodiment. In embodiments where application 115 is deployed in a cluster of nodes, host 701 may be deployed as one of the nodes of the cluster. As shown, host 701 may include one or more processors 705, such as processors 705A and 705B. In various embodiments, processors 705 may be implemented using any desired architecture or chip set, such as the SPARC™ architecture from Sun Microsystems or the x86-compatible architectures from Intel Corporation, Advanced Micro Devices, etc. Program instructions that may be executable to implement part or all of the functionality of resource management tool 105, applications 115 and instrumentation/monitoring infrastructure 125 may be partly or fully resident within a memory 710 at a given point in time, and may also be stored on a storage device 740. Memory 710 may be implemented using any appropriate medium such as any of various types of RAM (e.g., DRAM, SDRAM, RDRAM, SRAM, etc.). In addition to processors 705 and memory 710, host 701 may also include one or more I/O interfaces 712 providing access to storage devices 740, one or more network interfaces 714 providing access to a network, interfaces to display devices (not shown), and the like. Any of a variety of storage devices 740 may be used to store the instructions as well as data for resource management tool 105 in different embodiments, include any desired type of persistent and/or volatile storage devices, such as individual disks, disk arrays, tape devices, optical devices such as CD-ROMs, CD-RW drives, DVD-ROMs, DVD-RW drives, flash memory devices, various types of RAM and the like. One or more storage devices 740 may be directly coupled to host 701 in some embodiments (e.g., using the Small Computer Systems Interface (SCSI) protocol), or may be accessible over any desired storage interconnect such as a fiber channel fabric or storage area network (SAN) in other embodiments.

In some embodiments, resource management tool 105 and/or instrumentation/monitoring infrastructure 125 may be included within an operating system, a storage management software product or another software package, while in other embodiments, resource management tool 105 may be packaged as a standalone product. In one embodiment, a plurality of analytic performance tools 180, each using a different algorithm and/or different sets of input parameters, may be available for use by resource management tool 105, and a specific analytic performance tool 105 may be selected for use via a pluggable programming interface or a configuration parameter. In some embodiments, part or all of the functionality of instrumentation/monitoring infrastructure 125 and/or resource management tool 105 may be implemented via one or more hardware devices (e.g., via one or more Field Programmable Gate Array (FPGA) devices) or in firmware.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system, comprising:
one or more processors; and
memory storing program instructions;
wherein the program instructions are executable by the one or more processors to:
receive first program input specifying a set of performance metrics that indicate execution performance of an application on a first computing platform;
receive second program input specifying a set of service level objectives for the application;
derive one or more conversion factors between resources of the first computing platform and resources of a target computing platform, wherein the target computing platform is different than the first computing platform;
prior to deploying the application to the target computing platform, automatically determine respective target values of one or more concurrency configuration parameters to be set in a subsequent deployment of the application to the target computing platform by using an analytic model which uses the set of performance metrics for the first computing platform, the set of service level objectives, and the one or more conversion factors, wherein the program instructions are executable to determine the respective target values such that the service level objectives are satisfied, wherein the respective target values include one or more of:
a target number of concurrent threads of execution to be set in the subsequent deployment of the application to the target computing platform;
a target number of executable application processes to be set in the subsequent deployment of the application to the target computing platform;
a target number of virtual machines to be set in the subsequent deployment of the application to the target computing platform; and automatically deploy the application to the target computing platform, wherein in deploying the application to the target computing platform the program instructions are executable by the one or more processors to set the one or more concurrency configuration parameters to the respective target values.

2. The system as recited in claim 1, wherein the respective target values include a target number of computer hosts at which the application is to be deployed, and a target number of application processes to be executed at each computer host at which the application is to be deployed.

3. The system as recited in claim 1, wherein the program instructions are further executable by the one or more processors to:
monitor an execution of the application at the first computing platform to obtain the set of performance metrics.

4. The system as recited in claim 1, wherein the program instructions are executable by the one or more processors to use the analytic model to perform a regression technique to determine a baseline value of a resource utilization level at the first computing platform, wherein the baseline value is indicative of resources consumed by tasks other than processing of incoming service requests by the application during execution of the application at the first computing platform.

5. The system as recited in claim 1, wherein the target computing platform differs from the first computing platform in at least one of: total processing capacity, total memory, number of cluster nodes, number of processors, processor architecture, and processor vendor.

6. The system as recited in claim 1, wherein the program instructions are further executable by the one or more processors to:
monitor execution performance of the application after the application is deployed at the target computing platform to determine whether a concurrency configuration parameter setting is to be modified; and
in response to determining that a concurrency configuration parameter setting is to be modified, automatically modify the concurrency configuration parameter setting without administrator intervention.

7. The system as recited in claim 6, wherein, in response to determining that a concurrency configuration parameter setting is to be modified, the program instructions are further executable by the one or more processors to:
automatically provision one or more additional computing resources for the application.

8. The system as recited in claim 6, wherein, in response to determining that a concurrency configuration parameter setting is to be modified, the program instructions are further executable by the one or more processors to:
automatically migrate at least a portion of the application to another computing platform different than the target computing platform.

9. A computer-implemented method, comprising:
receiving first program input specifying a set of performance metrics that indicate execution performance of an application on a first computing platform;
receiving second program input specifying a set of service level objectives for the application;
deriving one or more conversion factors between resources of the first computing platform and resources of a target computing platform, wherein the target computing platform is different than the first computing platform;
prior to deploying the application to the target computing platform, automatically determining respective target values of one or more concurrency configuration parameters to be set in a subsequent deployment of the application to the target computing platform by using an analytic model, wherein the analytic model uses the set of performance metrics for the first computing platform, the set of service level objectives, and the one or more conversion factors, wherein the respective target values are determined such that the service level objectives are satisfied, wherein the respective target values include one or more of:
a target number of concurrent threads of execution to be set in the subsequent deployment of the application to the target computing platform;
a target number of executable application processes to be set in the subsequent deployment of the application to the target computing platform;
a target number of virtual machines to be set in the subsequent deployment of the application to the target computing platform; and
automatically deploying the application to the target computing platform, wherein automatically deploying the application to the target computing platform includes setting the one or more concurrency configuration parameters set to the respective target values.

10. The method as recited in claim 9, further comprising:
monitoring execution performance of the application after the application is deployed at the target computing platform to determine whether a concurrency configuration parameter setting is to be modified; and
in response to determining that a concurrency configuration parameter setting is to be modified, automatically modifying the concurrency configuration parameter setting without administrator intervention.

11. The method as recited in claim 9, wherein the analytic model utilizes a regression technique to determine a baseline value of a resource utilization level at the first computing platform, wherein the baseline value is indicative of resources consumed by tasks other than processing of incoming service requests by the application during execution of the application at the first computing platform.

12. A tangible computer readable medium storing program instructions, wherein the program instructions are computer executable to:
receive first program input specifying a set of performance metrics that indicate execution performance of an application on a first computing platform;
receive second program input specifying a set of service level objectives for the application;
derive one or more conversion factors between resources of the first computing platform and resources of a target computing platform, wherein the target computing platform is different than the first computing platform;
prior to deploying the application to the target computing platform, automatically determine respective target values of one or more concurrency configuration parameters to be set in a subsequent deployment of the application to the target computing platform by using an analytic model which uses the set of performance metrics for the first computing platform, the set of service level objectives, and the one or more conversion factors, wherein the program instructions are executable to determine the respective target values such that the service level objectives are satisfied, wherein the respective target values include one or more of:
a target number of concurrent threads of execution to be set in the subsequent deployment of the application to the target computing platform;

a target number of executable application processes to be set in the subsequent deployment of the application to the target computing platform;

a target number of virtual machines to be set in the subsequent deployment of the application to the target computing platform; and automatically deploy the application to the target computing platform, wherein in deploying the application to the target computing platform the program instructions are executable to set the one or more concurrency configuration parameters to the respective target values.

13. The computer readable medium as recited in claim 12, wherein the program instructions are further computer executable to:

monitor execution performance of the application after the application is deployed at the target computing platform to determine whether a concurrency configuration parameter setting is to be modified; and in response to determining that a concurrency configuration parameter setting is to be modified, automatically modify the concurrency configuration parameter setting without administrator intervention.

14. The computer readable medium as recited in claim 12, wherein the program instructions are executable to use the analytic model to perform a regression technique to determine a baseline value of a resource utilization level at the first computing platform, wherein the baseline value is indicative of resources consumed by tasks other than processing of incoming service requests by the application during execution of the application at the first computing platform.

15. The computer readable medium as recited in claim 12, wherein the respective target values include a target number of executable application processes to be set in the deployment of the application.

16. The computer readable medium as recited in claim 12, wherein the respective target values include a target number of virtual machines to be set in the deployment of the application.

17. The computer readable medium as recited in claim 12, wherein the first computing platform is a test computing platform on which the application is tested prior to production, and wherein the target computing platform is a production computing platform.

* * * * *